US006761827B2

(12) United States Patent
Coffey

(10) Patent No.: US 6,761,827 B2
(45) Date of Patent: Jul. 13, 2004

(54) METHOD AND APPARATUS FOR PURIFYING WATER

(75) Inventor: Richard T. Coffey, Pompano Beach, FL (US)

(73) Assignee: Zodiac Pool Care, Inc., Pompano Beach, FL (US)

( * ) Notice: Subject to any disclaimer, the term of this patent is extended or adjusted under 35 U.S.C. 154(b) by 320 days.

(21) Appl. No.: 10/014,944

(22) Filed: Oct. 26, 2001

(65) Prior Publication Data
US 2003/0080069 A1 May 1, 2003

(51) Int. Cl.$^7$ .................................................. C02F 1/46
(52) U.S. Cl. ...................... 210/748; 210/753; 210/192; 210/198.1; 204/660
(58) Field of Search ................. 210/748, 753, 210/192, 198.1; 204/660

(56) References Cited

U.S. PATENT DOCUMENTS

| 4,263,114 A | 4/1981 | Shindell |
| 4,328,084 A | 5/1982 | Shindell |
| 4,364,814 A | 12/1982 | Langley |
| 4,451,341 A | 5/1984 | Miller |
| 4,680,114 A | 7/1987 | Hayes |
| 4,781,805 A | 11/1988 | Dahlgren |
| 4,808,290 A * | 2/1989 | Hilbig ..................... 204/228.2 |
| 4,936,979 A | 6/1990 | Brown |
| 4,992,156 A | 2/1991 | Silveri |
| 5,076,315 A | 12/1991 | King |
| 5,746,923 A | 5/1998 | Forward |
| 5,772,896 A | 6/1998 | Denkewicz |
| 5,792,369 A | 8/1998 | Johnson |
| 5,935,609 A | 8/1999 | Denkewicz, Jr. et al. |
| 5,993,669 A | 11/1999 | Fulmer |
| 5,993,753 A | 11/1999 | Davidson |
| 6,039,883 A | 3/2000 | Milde et al. |
| 6,093,422 A | 7/2000 | Denkewicz, Jr. et al. |
| 6,132,627 A | 10/2000 | Joko et al. |
| 6,190,547 B1 | 2/2001 | King et al. |
| 6,197,195 B1 | 3/2001 | Booth et al. |
| 6,207,060 B1 | 3/2001 | McKay |
| 6,210,566 B1 | 4/2001 | King |
| 6,221,321 B1 | 4/2001 | Fleischer et al. |
| 6,224,744 B1 | 5/2001 | Casado Gimenez et al. |
| 6,224,779 B1 | 5/2001 | Spector |
| 6,254,788 B1 | 7/2001 | Davidson |
| 6,254,894 B1 | 7/2001 | Denkewicz, Jr. et al. |
| 6,287,450 B1 * | 9/2001 | Hradil ........................ 205/745 |
| 6,287,462 B1 | 9/2001 | Likos |
| 6,508,929 B1 * | 1/2003 | Mercer ....................... 205/701 |
| 6,524,475 B1 * | 2/2003 | Herrington et al. ......... 210/192 |
| 6,551,518 B2 * | 4/2003 | Gargas ........................ 210/748 |
| 2002/0189954 A1 | 12/2002 | Miyazaki et al. |

FOREIGN PATENT DOCUMENTS

| AU | 718005 | 7/2000 |
| DE | 36 29 010 A | 3/1988 |
| GB | 1 310 764 A | 3/1973 |
| GB | 2 348 945 A | 10/2000 |
| WO | WO 97/37939 | 10/1997 |
| WO | WO 99/44949 | 9/1999 |
| WO | WO 03/040038 A2 | 5/2003 |
| ZA | 97/2867 | 3/1999 |

OTHER PUBLICATIONS

Patent Abstracts of Japan, vol. 2002, No. 02, Apr. 2, 2002 & JP 2001 2766828 A (Miyazaki Tomoyoshi; Miyazaki Akiko, Oct. 9, 2001 Abstract.
Fifth Edition Chemical Engineers' Handbook, Robert H. Perry/Cecil H. Chilton (published by McGraw–Hill Book Company), Section 5 Fluid and Particle Mechanics, pp. 5–10 thru 5–15, (copyright 1973).

* cited by examiner

Primary Examiner—Betsey Morrison Hoey
(74) Attorney, Agent, or Firm—Bruce D. Gray; Dean W. Russell; Kilpatrick Stockton LLP

(57) ABSTRACT

The invention relates to a method for purifying water by forming in an electrolytic cell molecular halogen, hypohalic acid, hypohalite ions or combinations thereof, from halide ions dissolved in the water; and dissolving one or more soluble metal salts in the water to provide corresponding metal ions. The invention also relates to a system for purifying water, having an electrolytic cell comprising a plurality of electrodes sufficient to electrolytically convert halide ion in the water into molecular halogen, hypohalic acid, or hypohalite ions, or combinations thereof; and a metal generator, which provides concentrations of one or more metals to the water.

20 Claims, No Drawings

METHOD AND APPARATUS FOR PURIFYING WATER

BACKGROUND OF THE INVENTION

1. Field of the Invention

This invention relates to the methods and apparatus for purifying water using a combination of electrolytic purification and introduction of microbiocidal metal species into the water. More particularly, the invention relates to the combination of electrolytic purification and the introduction of biocidal metal ions into the water.

2. Description of Related Art

Electrolytic purification of water has been carried out for some time. The process involves the purification of water that is saline, i.e., that has some concentration of halide ion in it. For instance, in many swimming pools in Australia, where electrolytic purification of pool water is currently more popular than in the United States, a slight salinity level is achieved by dissolution of quantities of sodium chloride into the pool water. The water, with its dissolved halide ion, is passed through an electrolytic cell. The halide ions are oxidized by electrolysis to form hypohalic acid, hypohalite ions, or both (believed to occur through the intermediate of molecular halogen), which have known utility in disinfecting water (and whose use is typically known as "chlorinating" the water). In addition, the electrolysis reaction converts water into hydrogen and oxygen; some of the oxygen is converted further into ozone, which also has a disinfecting effect on the pool water.

Electrolytic purification is desirable because it is safe, effective, and for applications such as swimming pools, hot tubs, spas, etc., it eliminates much of the need for the pool owner or operator to handle chemicals and monitor water chemistry. The salinity levels necessary to achieve effective chlorination levels are typically well below the organoleptic thresholds in humans, and the primary chemical required to be handled by the operator is a simple alkali metal halide salt. In addition, operation of the electrolytic cell is comparatively easy, and requires little attention beyond ensuring the proper current and voltage levels are set, and maintaining the correct salinity levels in the water.

One of the disadvantages associated with electrolytic purification is the cost of the electrolytic cell, as well as the cost of replacement electrodes, which can corrode, become fouled with scale and the like or otherwise become inactivated over time. These costs are primarily driven by the size of the electrodes, which are typically constructed from titanium coated with platinum or ruthenium. Electrodes having a surface area sufficient to generate adequate chlorine levels represent a significant portion of the cost of installing and maintaining an electrolytic purification system. In addition, electrolytic cell life is limited due to the current density through the cell over time.

The introduction of microbiocidal metals into water to sanitize it has also been suggested for and used in various water purification applications, such as in pools and spas. In particular, various methods of introducing metal ions, such as silver ions or copper ions, into the water have been proposed. The use of these ions to purify, e.g., pool water, results in decreased need for chlorination. Highly chlorinated pool water is often uncomfortable to, and is thought to possibly have adverse effects on the health of, swimmers and bathers, decrease the useful life of swimwear, etc. One method of introducing such ions into water that has been proposed involves the use of sacrificial electrodes containing metals corresponding to the desired ions, including alloys of silver and copper, and electrolytically dissolving the metals into the water. Other methods include contacting the water with substrates that have been coated or impregnated with metal, soluble metal salts, or some combination thereof. These methods can be difficult for pool owners to control, and as a result, can sometimes provide unreliable control of metal delivery, and can cause stained surfaces when too much metal has been delivered, or result in insufficient sanitation when too little metal has been delivered.

SUMMARY OF THE INVENTION

This invention results from the surprising discovery that the use of electrolytic purification of water can advantageously be combined with the introduction of microbiocidal metals to provide a purification system and method that is safe, effective, and economical. The combination of microbiocidal metals with electrolytic purification allows decreased levels of metal ion to be present, along with decreased chlorine levels. As a result, there is decreased likelihood of unpleasant side effects from either technique, such as staining of pool surfaces, chlorine damage to hair and clothing of swimmers and bathers, etc. At the same time, the pool water is sanitized for a wide variety of microorganisms by the use of multiple methods. Finally, the presence of metals in the water, at least through the resulting decrease in necessary chlorine levels, can reduce the size of electrodes necessary to maintain appropriate levels of protection. This results in a substantial decrease in the cost of deploying and maintaining an electrolytic purification system.

In one embodiment, the invention relates to a method for purifying water by forming in an electrolytic cell molecular halogen, hypohalic acid, hypohalite ions, or combinations of these, from halide ions dissolved in the water; and dissolving one or more metals in the water.

In another embodiment, the invention relates to a system for purifying water, having an electrolytic cell comprising a plurality of electrodes sufficient to electrolytically convert halide ion in the water into molecular halogen, hypohalic acid, hypohalite ions, or combinations of these; and a metal generator, which provides concentrations of one or more metals to the water.

The metal generator may contain metallic material which dissolves or disperses into the water, or may contain soluble metal salts, or combinations thereof.

These embodiments of the invention result in a method and system that achieve the advantages of electrolytic purification and the advantages of microbiocidal metal ion purification, but vastly reduce the concomitant disadvantages of each. Further, the combination of techniques results in a significantly more economical purification process than is achievable with electrolytic purification alone.

DETAILED DESCRIPTION OF SPECIFIC EMBODIMENTS

The methods and apparatus described herein can be used to sanitize and protect water from the growth of microorganisms, such as bacteria, virii, fungi, algae, and the like. This sanitizing and protecting effect can be used for water in a variety of applications, including swimming pools, hot tubs, spas, as well as wastewater treatment facilities, cooling towers, and the like. The description below will focus on applications for swimming pools, hot tubs, spas, and the like. Those familiar with the art of water purification will be able to modify the teachings below to other water treatment applications without the exercise of undue experimentation.

In many cases, the halide ion dissolved in the water will be chloride ion, with the result that the halogen gas formed is molecular chlorine, and the hypohalic acid formed by electrolysis will be hypochlorous acid, HOCl. It will be understood, however, that other halide ions and/or acids, such as bromide, iodide, hypobromous acid, or combinations thereof, can be present in the water and oxidized by electrolysis to form similar acids and which can dissociate to the corresponding oxidized ions, which may also have a sanitizing effect.

Similarly, the metal introduced into the water will, in many cases, contain silver, copper, or some combination thereof, because of the recognized bactericidal, viricidal, and algaecidal properties of these metals. Other metals, such as zinc, can also be introduced into the water, alone or combined with the metals described above, to provide, e.g., additional biocidal activity. The metals can be introduced as metallic, zero valence material, or as metal ions that can be introduced into the water by dissolution of soluble metal salts, or by the dissolution of the metal itself. For example, silver ion can be introduced into the water through the dissolution of silver nitrate, or through the dissolution of metallic silver as the result of conversion to silver oxide and subsequent conversion of the oxide to more soluble silver species. Copper ion can be introduced into solution through the dissolution of copper sulfate or copper chloride, for example. Mixtures of different salts, or of salts with metallic material, may be combined together to provide the necessary concentration of metal ions in the water.

One particular material suitable for introducing metal ions into the water is a combination of soluble copper salt and metallic silver, deposited on a substrate, and sold under the name Nature$^2$® by Zodiac Pool Care, Inc.

The electrodes used in the electrolytic cell may be of any suitable material. However, the electrodes are generally not sacrificial electrodes made of copper, silver, zinc, or any metal species that it is desired to dissolve in the water, or any alloy thereof. One suitable electrode material is titanium, which may be coated to reduce corrosion and fouling, e.g. with a precious or semi-precious metal, such as platinum, ruthenium, or iridium.

The surface area of electrodes used in the invention can be considerably reduced as compared to the surface area of electrodes used in simple electrolytic purification (i.e., without the presence of microbiocidal metal ions). The amount of this reduction typically ranges from about 25% to about 90% of the area of electrodes used in simple electrolytic purification. Assuming a halide ion concentration ranging from about 2500 ppm to about 5000 ppm, which is a typical range for salinated pool water, and a DC voltage power supply of about 5 to about 25 V, electrode surface areas generally varying between about 10 cm$^2$ to about 150 cm$^2$, will produce a chlorine concentration (calculated as Cl$_2$) of between about 0.5 ppm and about 2.0 ppm. This is sufficient to sanitize and protect a typical swimming pool provided that the concentrations of silver and copper ions in the water are maintained between about 0.010 ppm and about 0.080 ppm (silver ion) and between about 0.020 ppm and about 0.100 ppm (copper ion), respectively. By contrast, in the absence of silver or copper ion, the chlorine content of the water (calculated as Cl$_2$) will generally have to be maintained at between about 2.0 ppm and about 6.0 ppm, requiring an electrode area of between about 75 cm$^2$ and about 200 cm$^2$.

The electrode voltage in the electrolytic cell typically ranges between about 5 V and about 25 V, and current flow across the electrode ranges from about 0.75 A to about 12.0 A. The source of microbiocidal metal ions is generally provided in amounts capable of introducing bactericidally, viricidally, fungicidally and/or algaecidally effective amounts of metal ion into the water. Generally, these levels of metal ions range from about 0.010 ppm to about 0.500 ppm. When Nature$^2$® is used as the source of metal ions, approximately 1.15 g to approximately 7.75 g of material per 10,000 gal. of water can be used to provide effective concentrations of silver and copper ion.

In general, sanitization of a body of water can be accomplished by removing a flow stream from the water, passing this flow stream through the electrolytic cell, and returning the treated flow stream to the body of water. Over time, and with a discrete body of water, hypohalic acid will have been carried by the pump and dispersed throughout the body of water, where it remains active in sanitizing the water. Similary, microbiocidal metal ions are typically introduced by removing a flow stream from a body of water, contacting the flow stream with a source for the microbiocidal metal ions, and returning the treated flow stream through the body of water. In either case, flow rates and residence times for the removed flow streams are selected so that the water is in contact with the electrolytic cell or the source of metal ion for a sufficient time to achieve the desired results, i.e., the desired chlorine or metal ion concentrations. Alternatively, if a flow stream of water, rather than a body of water, is to be purified, the entire flow stream of water can be contacted with the electrolytic cell and the source of metal ions.

In a specific embodiment, it has been found desirable to maintain separate flow paths for water passing through the electrolytic cell and for water into which microbiocidal metal ions are introduced. This limits the likelihood of any undesirable interactions between the metal ions and the electrolytic cell (such as the plating out of metal ions onto the electrodes, which may result if water containing high concentrations of metal ion pass through the electrolytic cell) as well as between the hypohalic acid(s) or hypohalite ions and the source of metal ions.

What is claimed is:

1. A method for purifying water comprising:
   forming in an electrolytic cell molecular halogen, hypohalic acids, hypohalite ions, or combinations thereof, from halide ions dissolved in the water; and
   dissolving one or more metals in the water to provide corresponding metal ions.

2. The method of claim 1, wherein the molecular halogen comprises chlorine.

3. The method of claim 1, wherein the hypohalic acid comprises hypochlorous acid, HOCl.

4. The method of claim 1, wherein the dissolved metal comprises metal ions selected from the group consisting of copper ions, silver ions, zinc ions, and combinations thereof.

5. The method of claim 4, wherein the metal ions are copper ions and silver ions.

6. The method of claim 1, wherein the source of the dissolved metal is one or more metal salts selected from the group consisting of silver nitrate, copper sulfate, copper chloride, and mixtures thereof.

7. The method of claim 1, wherein the electrolytic cell comprises at least two electrodes, wherein at least one of the electrodes comprises coated titanium.

8. The method of claim 1, further comprising separating from the water a first stream and a second stream, directing the first stream to the electrolytic cell, and directing the second stream to contact the metal.

9. The method of claim 8, further comprising returning the first stream and the second stream to the water subsequent to electrolysis of chloride ion and dissolution of the metal salt.

10. The method of claim 1, further comprising reversing the polarity of the electrolytic cell.

11. A system for purifying water, comprising:
- an electrolytic cell comprising a plurality of electrodes sufficient to electrolytically convert halide ion in the water into molecular halogen, hypohalic acid, hypohalite ions, or combinations thereof; and
- a metal generator, which provides concentrations of one or more metals to the water.

12. The system of claim 11, wherein the metal generator provides bactericidally, algaecidally, fungicidally, or viricidally effective concentrations of metal to the water.

13. The system of claim 11, further comprising a first conduit for supplying water to the electrolytic cell, a second conduit from returning water from the electrolytic cell, a third conduit for supplying water to the metal generator, and a fourth conduit for returning water from the metal generator, wherein the first conduit and the fourth conduit are completely separate and the second conduit and the third conduit are completely separate.

14. The system of claim 11, wherein the metal comprises one or more metal ions selected from the group consisting of silver ion, copper ion, zinc ion, and mixtures thereof.

15. The system of claim 14, wherein the metal ions comprise silver ion and copper ion.

16. The system of claim 11, wherein the metal generator comprises metallic material.

17. The system of claim 16, wherein the metallic material comprises metallic silver.

18. The system of claim 11, wherein at least one of the electrodes is a coated titanium electrode.

19. The system of claim 18, wherein each of the electrodes is a coated titanium electrode.

20. The system of claim 11, wherein the electrode surface area, electrode spacing, applied electrode voltage, and current flow across the electrode are sufficient to generate a halogen concentration in the water, calculated as $Cl_2$, of approximately 0.5 ppm from a halide ion concentration in the water of about 3200 ppm.

* * * * *